United States Patent
Daware et al.

(10) Patent No.: US 11,583,924 B2
(45) Date of Patent: Feb. 21, 2023

(54) SYNTHESIS OF NANO PARTICLES

(71) Applicant: Tata Consultancy Services Limited, Mumbai (IN)

(72) Inventors: Santosh Vasant Daware, Pune (IN); Beena Rai, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 200 days.

(21) Appl. No.: 16/727,757

(22) Filed: Dec. 26, 2019

(65) Prior Publication Data

US 2020/0206819 A1 Jul. 2, 2020

(30) Foreign Application Priority Data

Dec. 31, 2018 (IN) .............................. 201821049992

(51) Int. Cl.
*B22F 9/04* (2006.01)
*G01N 15/02* (2006.01)
*B22F 1/054* (2022.01)
*B22F 1/107* (2022.01)
*B22F 1/145* (2022.01)
(Continued)

(52) U.S. Cl.
CPC ................ *B22F 9/04* (2013.01); *B22F 1/054* (2022.01); *B22F 1/107* (2022.01); *B22F 1/145* (2022.01); *G01N 15/02* (2013.01); *B22F 1/147* (2022.01); *B22F 2009/043* (2013.01); *B22F 2202/01* (2013.01); *B22F 2304/058* (2013.01); *B22F 2304/10* (2013.01); *B22F 2998/10* (2013.01); *B82Y 30/00* (2013.01); *B82Y 40/00* (2013.01); *G01N 2015/0038* (2013.01); *G01N 2015/0042* (2013.01)

(58) Field of Classification Search
None
See application file for complete search history.

(56) References Cited

U.S. PATENT DOCUMENTS 6,202,471 B1 * 3/2001 Yadav ...................... B82Y 5/00
73/31.05
8,791,191 B2 7/2014 Burgard et al.
(Continued)

FOREIGN PATENT DOCUMENTS

CN 104803408 7/2015

OTHER PUBLICATIONS

Guo, L. et al. (2000). "Synthesis and Characterization of Poly(vinylpyrrolidone)-Modified Zinc Oxide Nanoparticles," *Chem. Mater.*, vol. 12; pp. 2268-2274.

*Primary Examiner* — George Wyszomierski
(74) *Attorney, Agent, or Firm* — Finnegan, Henderson, Farabow, Garrett & Dunner LLP

(57) ABSTRACT

A method for synthesis of nanoparticles are described. The method includes dispersing metal oxide powder in a mixture of a base liquid and a surfactant to form a primary mixture, grinding the primary mixture using a grinding media by periodically adding a surfactant solution to form a slurry, extracting a predetermined amount of sample from the slurry at periodic time intervals to obtain a testing solution to assess particle size of in the slurry using a particle size analyzer; and systematically adding the surfactant solution and the grinding media to the slurry based on the assessed particle size in the testing solution until a mean particle size of the nanoparticles is achieved.

8 Claims, 5 Drawing Sheets

(51) Int. Cl.
*B82Y 30/00* (2011.01)
*B82Y 40/00* (2011.01)
*G01N 15/00* (2006.01)

(56) References Cited

U.S. PATENT DOCUMENTS

| | | | |
|---|---|---|---|
| 10,005,677 B2 * | 6/2018 | Lee | B01F 7/00 |
| 2012/0156494 A1 * | 6/2012 | Wolfrum | C01B 13/326 |
| | | | 428/402 |
| 2013/0274091 A1 * | 10/2013 | Maparu | B01J 35/004 |
| | | | 502/167 |
| 2014/0056992 A1 * | 2/2014 | Rai | B82Y 30/00 |
| | | | 424/617 |
| 2014/0225024 A1 * | 8/2014 | Kim | H01F 41/0266 |
| | | | 252/62.55 |
| 2015/0048272 A1 * | 2/2015 | Rai | B02C 23/36 |
| | | | 252/75 |
| 2017/0073530 A1 * | 3/2017 | Jin | C01G 49/0072 |

* cited by examiner

US 11,583,924 B2

SYNTHESIS OF NANO PARTICLES

PRIORITY CLAIM

This U.S. patent application claims priority under 35 U.S.C. § 119 to: India Application No. 201821049992, filed on Dec. 31, 2018. The entire contents of the aforementioned application are incorporated herein by reference.

TECHNICAL FIELD

This disclosure relates generally to synthesis of nanoparticles, and more particularly to synthesis of nanoparticles dispersed in a liquid medium.

BACKGROUND

Particles having one or more dimensions less than 100 nm are referred as nanoparticles. The application of nanoparticles requires to be of precise size so that it shows enhanced properties over bulk material, for example, properties like adsorption, reflection and scattering. These factors are primarily governed by the particle size. Conventionally, nanoparticles are synthesized using different ways which are broadly classified as Top-Down approach and Bottom-Up approach. The former method involves reducing large scale particles into nano-scale and latter deals with building up of nano-structures from atoms and molecules. The Top-Down approach is slow and costlier compared to Bottom-Up approach. However, Top-Down approach is scalable. Moreover, Bottom-up approach requires exhaustive list of chemical, expertise and controlled conditions. Using the Top-Down method of grinding is highly energy intensive, leaving room for process optimization in terms of both power used and particle size achieved.

The inventors here have recognized several technical problems with such conventional systems, as explained below. The nanopartciles prepared using the above methods have various applications, one such application of nanoparticle dispersion is as coolant, generally, termed as nanocoolant or nanofluids. One of the many uses of nanofluids is in vehicles, used as an advanced coolant. Nanofluids are fluids that have engineered colloidal suspensions and contains particles size which are in the nanometer size range. Nanofluids have a variety of applications in heat transfer with their high surface area and increased thermal conductivity due to the solid particles suspended within them.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, embodiments herein provides a method for synthesis of nanoparticles dispersed in a liquid medium. In one aspect the method includes steps of dispersing metal oxide powder in a mixture of a base liquid and a surfactant to form a primary mixture, wherein the primary mixture comprises 10 to 20 wt % of the metal oxide powder; grinding the primary mixture using a grinding media by periodically adding a surfactant solution to form a slurry, wherein varying concentration of the surfactant solution is prepared by continuous stirring and heating of the surfactant with the liquid medium; extracting a predetermined amount of sample from the slurry at periodic time intervals to obtain a testing solution to assess particle size of in the slurry using a particle size analyzer; and systematically adding the surfactant solution and the grinding media to the slurry based on the assessed particle size in the testing solution until a mean particle size of the nanoparticles is achieved, wherein the systematic addition of the surfactant solution and the grinding media facilitates achieving finer particle size in a steady state of the slurry.

The method also includes vacuum filtrating the slurry to separate the grinding media from the slurry and sonicating the vacuum filtered slurry using a dispersant to obtain nanocoolant containing. Further, the primary mixture comprises 10 to 20 wt % of the metal oxide powder. The in the aforementioned method, while grinding the primary mixture, particle size of metal oxide particles in the mixture is periodically assessed such that an average particle size of metal oxide particles is less than about 80 nm and the method is performed in a planetary ball mill, wherein the metal oxide powder is placed in each pot of the planetary ball mill.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
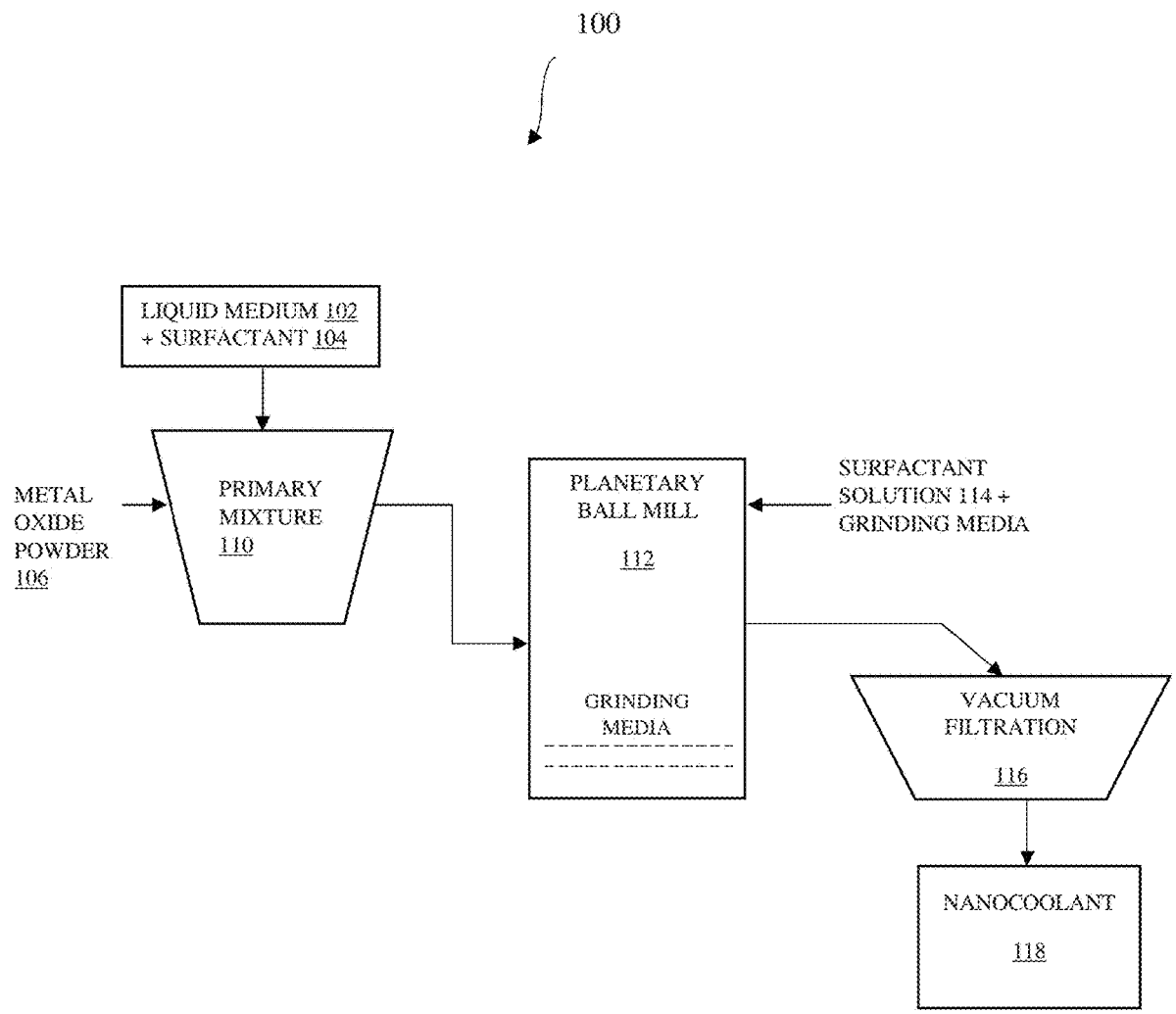
FIG. 1 illustrates a block diagram for method of synthesis of nanoparticles, in accordance with an example embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

According to an embodiment of the present subject matter, methods for synthesis of nanoparticles are described. As mentioned earlier, the synthesized nanoparticles have many applications, one such application of nanoparticle dispersion is as coolant, generally, termed as nanocoolant or nanofluids. One of the many uses of nanofluids is in vehicles, used as an advanced coolant.

As mentioned above, the prime application of nanoparticles is in preparation of nanocoolants. Existing commercial coolants or antifreeze, which are typically mixture of water, glycols—ethylene glycol, propylene glycol, and additives like corrosion inhibitors, pH buffers, colorant etc. These coolant have relatively low overall heat transfer performance. Some of the additives may be added to enhance efficiency of the coolant and thus, of the nanocoolant produced using such a coolant. For example, Disodium fluorescein dyes are added to help trace the source of leaks, and tolytriazole may be added as a corrosion inhibitor.

As widely known, addition of nanoparticles to these commercial coolants gives improvement in thermal conductivity and overall heat transfer coefficient. However, in order to have good performance, these nanocoolants should be stable for longer time. This challenge is addressed by choosing a proper dispersant and grinding to nanometer size. However, to meet commercial requirement nanocoolants need to be produced on large quantity. Current methods of production of nanocoolant is not up to the mark in terms of efficiency to meet the requirement. The production of nanocoolant is limited by production of nanoparticles. Moreover, the existing methods for nanoparticle production through hydrothermal route, aerosol flame reactor take lot of time and consume lot of energy. There are constant efforts to invent new methods of production or modify existing method. For example, wet milling is widely used method for production of nanoparticle in various industries such as pharmaceutical, specialty chemicals, paints, and the like. However, throughput of wet-milling and size of nanoparticles produced is tuned by operating parameters—operating speed, media type and composition of slurry—solid loading, % of jar filling, media to powder ratio.

In general, nanocoolants are used for improving efficiency of commercial engines. The nanocoolants also need to qualify for commercial coolant standards. With addition of such formed metal, metal oxide nanoparticles to liquid increases overall thermal conductivity of the composition. Such fluids called nanofluids have engineered colloidal suspensions. These suspended particles are in the nanometer size range. The particles can be metals, metal oxides or carbon nanotubes. These suspended particles impart enhanced thermo physical and heat transfer properties to the base fluid (usually water, oil or ethylene glycol, coolant). Therefore, care should be taken in the method of nanocoolant preparation such that no elements should be introduced which could potentially harm the engine.

For example, a dilute nanoparticles suspension in a coolant may enhance thermal conductivity of a base coolant by a significant amount. The nanocoolants may be prepared in a planetary ball mill which is a Top-Down approach and is very energy intensive. Thus one of the focus of the present subject matter is to optimize power consumption to get the lowest particle size possible. For example, in an established protocol calls for the synthesis of nanopartciles, addition of 1000 gm of a grinding media at the start of the process, not only is a very large amount used unnecessarily at the outset of grinding, but also the particle size reaches a plateau without further reduction, that is around 98 nm. Therefore, by varying the amount of grinding media added at the onset as well as media added dynamically while grinding could prevent jamming of the instrument and bring the particle size down further.

In order to make the nanocoolant at large scale, Top-Down method is preferred which is an energy intensive process. As mentioned earlier, Bottom-Up method may be ruled out because it gives low yield and needs exhaustive list of reagents and very controlled conditions. The Bottom-Up method takes long time and consumes a lot of electricity. Furthermore, in conventionally known methods, constant media to powder ratio is used as one of the criteria to measure the effectiveness of the process. One of the drawbacks of such method is use of high powder to media ratio leads to intensive grinding of seed particle, but this leads to contamination of the nanocoolant due to media to media attrition. The process also makes the nanocoolant unstable. In order to grind the powder to nano size one cannot reduce the media to powder ratio to a low value.

In view of the foregoing, the present embodiments provide systematic addition of media is an effective method to reduce the particle size. Therefore it is better to use a smaller amount of media at the start of the operation and supplement it periodically to prevent plateauing of particle size reduction. In the method of the present subject matter, the time required to achieve finer size is less compared to the base and hence energy consumed in production is less as number of grinding hours are reduced. Moreover, voidage in the milling pot or jar is tuned to reduce media to media attrition to achieve better quality of product.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates a block diagram representation of an apparatus 100 implementing a method for synthesis of nanoparticles, according to an embodiment of the present subject matter. It will be understood that intermediate mixtures produced at different levels and stages of preparation of the dispersion may be produced in different batches and in various quantities, as would be understood by those skilled in the art.

Referring now to FIG. 1, a mixture of a liquid medium 102 and a surfactant 104 is formed. A metal oxide powder 106, which may include particles of at least one metal oxide, is dispersed in the mixture of the liquid medium 102 and the surfactant 104 to form a primary mixture 110. The liquid medium 102 may include water and other equivalent fluids. The liquid medium 102 herein may be a base coolant. The base coolant may include a variety of heat transfer liquids but are not limited to, water, commercially available Internal Combustion (IC) engine coolants, water based antifreezes, such as glycols, alcohols, and combination thereof, polyols, and the like. Furthermore, the liquid medium 102 includes a blend of additives, including, for example, lubricants, buffers, corrosion inhibitors, and the like. In one implementation, the liquid medium 102 may include any commercially available coolant known in the art.

The surfactant 104 may include but not limited to sodium citrate, p-hydroxy benzoic acid, and polymeric surfactants like polyvinylpyrrolidone. The surfactant 104 may be a suitable substance for the chosen liquid medium 102 and may include, an organic surfactant or an inorganic surfactant. The organic surfactant includes but is not limited to polymeric surfactant, carboxylic acids, esters, ethers, alcohols, cellulose, sugar derivative like or combinations thereof. In one implementation, suitable surfactant 104 for the liquid medium 102 and the metal oxide powder 106 is selected which can bind to metal or metal oxide powder so that it remain suspended.

The metal oxide powder 106 may include oxides of metals, such as titanium, iron, silicon, aluminum, zirconium, and zinc. Further, it would be appreciated that in other implementations, the metal oxide powder 106 may include particles of metals, metal alloys, or combinations thereof. In one implementation metal oxide powder is used in a crystalline form with an average particle size greater than 100 nm. For example, the particle size is in the range of about 0.1 to 1.0 microns. In an example of said implementation, average particle size of the metal oxide powder 106 is in the range of about 0.5 microns.

In one example, the primary mixture 110 is prepared by mixing the mixture of the liquid medium 102 and the surfactant 104 with about 20 to 25 wt % of the metal oxide powder 106. In one implementation, to prevent agglomeration and precipitation of metal oxide particles, the primary mixture 110 is dispersed using a disperser. The disperser may use any physical dispersing technique known in the art, such as ultra-sonication, and/or magnetic stirring, for dispersing the primary mixture 110.

Thereafter, the primary mixture 110 is ground to reduce the particle size of metal oxide powder 106 and to obtain a suspension of metal oxide nano particles, in the form of a slurry. The primary mixture 110 dispersed, is ground using a grinder 112. In one implementation, the grinder 112 may be a milling device, for example, a planetary ball mill, stirred media mill, attrition mill, or a bead mill. In one implementation, the primary mixture 110 may be ground using the planetary ball mill. Further, the grinder 112 may have multiple jars to receive and grind the primary mixture 110. Additionally, the grinder 112 includes a grinding media, for example, the grinding media may be one of zirconia, alumina, agate, silica, porcelain and steel and shape of the grinding media may be one of spherical or non-spherical rounded bullet, cylpebs and elliptical. In said implementation, the grinding media is placed in each pot of the planetary ball mill. Herein in this application, the grinding media term is alternatively used as media.

In said implementation, the average particle size of the grinding media is in the range of about range of 0.4 to 0.7 millimeter (mm), percentage filling of the jars may be in the range of about 50-70%, the ratio of the grinding media and the metal oxide powder 106 in the grinder 114, in terms of weight, may be in the range of about 20 to 40, and grinding time may be in the range of about 5 to 9 hours. Furthermore, during the grinding step, various process parameters, such as the grinding time, grinding speed, size of grinding media, percentage filling of the jars, grinding media to metal oxide powder ratio, primary mixture concentration, and the amount of dispersants, may be controlled and monitored.

Further, during grinding, particle size of the metal oxides may be analyzed at a periodic time intervals using a particle size analyzer (not shown in the figure). Also, while grinding the primary mixture, particle size of metal oxide particles in the mixture is periodically assessed such that an average particle size of metal oxide particles is less than about 80 nm. It will be understood that as the milling process (grinding process) nears completion, the time period after which the particle size are analyzed may be smaller as compared to the initial stages of the milling process. The particle size analyzer may utilize different techniques known in the art to analyze particle size, such as laser diffraction technique, acoustic spectroscopy technique, and ultrasound attenuation spectroscopy technique. In an example, a laser scattering particle size analyzer is used to analyze the size of particle in the grinder 114.

In one implementation, a certain predetermined amount sample is taken out of the slurry as a testing solution to measure the particle size of the metal oxide powder at a given particular time. Based on the particle size of the metal oxide powder in the testing solution, a surfactant solution 114 and the grinding media is systematically added to reduce the voidage created due to reduction in the particle size, until the desired mean particle size of nanoparticle (less than 70 nm) in the slurry is obtained. In an example of said implementation, the surfactant solution 114 having varying concentration was prepared using water. The systematic addition was performed such that particle size range is in between 50 nm to 90 nm or less than 90 nm. The systematic addition of the grinding media and surfactant solution effectively grinds the particles and facilitates achieving a finer particle size in a steady state of the slurry. As the grinding progresses, steady state is achieved at a point where particle size cannot be reduced further. However, in the present method, with the systematic addition of the surfactant solution 114 and the grinding media, the steady state of the grinding process is prolonged and finer particle size is achieved at an earlier stage.

In one implementation, single (same) surfactant may be used, while preparing the surfactant solution 114 and surfactant 104. In another implementation, combination of surfactants may be used.

The slurry is further vacuum filtered using a vacuum filtration unit 116 to separate the grinding media from the slurry using vacuum filtration technique known in the art. Also, the vacuum filtered slurry is further sonicated (not shown in figure) by adding a dispersant and a dispersing medium to the vacuum filtered slurry to obtain a diluted slurry and dispersing the diluted slurry to obtain a dispersed diluted slurry as the nanocoolant 118. The diluted slurry may be dispersed using one of ultra-sonication and magnetic stirring. The dispersant may be a suitable substance for the chosen dispersing medium and may include, but is not limited to, carboxylic acids, esters, ethers, alcohols, sugar and its derivatives or polymers, phosphates, amines, and the like or combinations thereof.

The nanopartciles prepared through the methods described herein are of size in the range on 50 nm to 70 nm and stable over long period of time. The nanocoolant dispersed with the nanoparticles synthesized using the above method were tested for thermal conductivity and overall heat transfer coefficient. Typically, thus formed nanocoolant are stable over several days or months. Sometimes, loose aggregates are formed which are easily dispersed back when small energy is supplied by means of magnetic stirring or ultra-sonication. The particle size of the nanoparticles synthesized using the present method were measured after six months with no significant difference in the particle size of original nanoparticles (refer experiments and results below).

EXPERIMENTS AND RESULTS

The results of methods for synthesis of nanopartciles have been validated using following examples. It will be understood that the examples discussed herein are only for the purpose of explanation and not to limit the scope of the present subject matter. Further, the test results are shown for a specific example of nanocoolant and should in no way be construed as the only stable nanocoolant that can be formed through the described method.

In one embodiment, 35.5 gm of zinc oxide powder was placed in each pot of a planetary ball mill. The zinc oxide power of 99% purity was obtained from the obtained from Loba chemie and is commercially available as zinc oxide powder. A mixture of surfactant and a base liquid was prepared. In the present example, 2.5 gm of Tri-sodium citrate was dissolved in 50 ml distilled of water to form the mixture. The mixture was poured in each pot of the planetary mill to form a primary mixture. The primary mixture was ground using Zirconia (obtained from Jyothi Ceramics™, India) as a grinding media of the size range 0.4 mm-0.7 mm to form a slurry. To the slurry a varying concentration of Polyvinylpyrrolidone (Sigma Aldrich™, 30 KDa, and PVP) as a surfactant solution was added with periodic intervals. The Polyvinylpyrrolidone (PVP) of varying concentration was prepared by continuous stirring and heating of the surfactant within distilled water. In the present example, at every hour of the grinding a predetermined amount of sample from the slurry was taken out at periodic time intervals as a testing solution. Particle size of the zinc oxide powder was assessed using a particle size analyzer. In the above, a combination of surfactant was used. For example, Tri-sodium citrate (surfactant) was used as it easily dissolves in water (liquid medium) and Polyvinylpyrrolidone was used as surfactant solution. Herein, since Polyvinylpyrrolidone needs stirring and heating hence first solution of Polyvinylpyrrolidone was prepared and added to the grinding step.

Based on the particle size, the Polyvinylpyrrolidone solution (the surfactant solution) and zirconia (the grinding media) was systematically added to the slurry until a mean particle size of the nanoparticles was achieved. In the present example, 5 ml of the PVP solution was added and a certain amount of grinding media as per the requirement. After the particles attained the required size and the slurry was vacuum filtered and sonicated to obtain nanocoolant.

Figure 3:
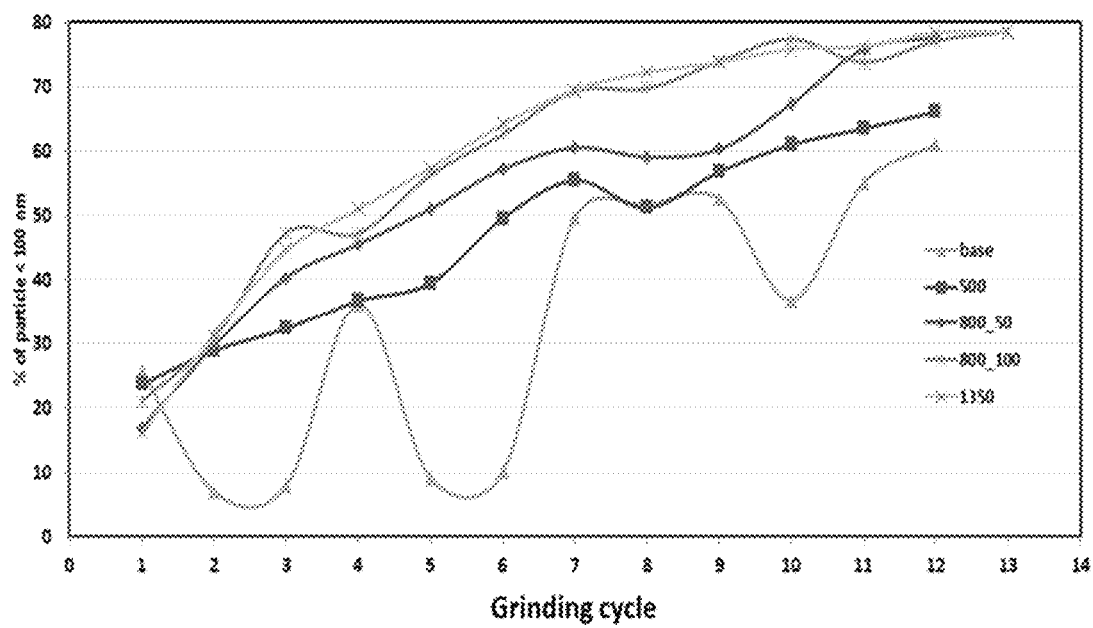
FIG. 3 illustrates a graphical representation of percentage diameters below 100 nm, in accordance with an example embodiment of the present disclosure.
Figure 4:
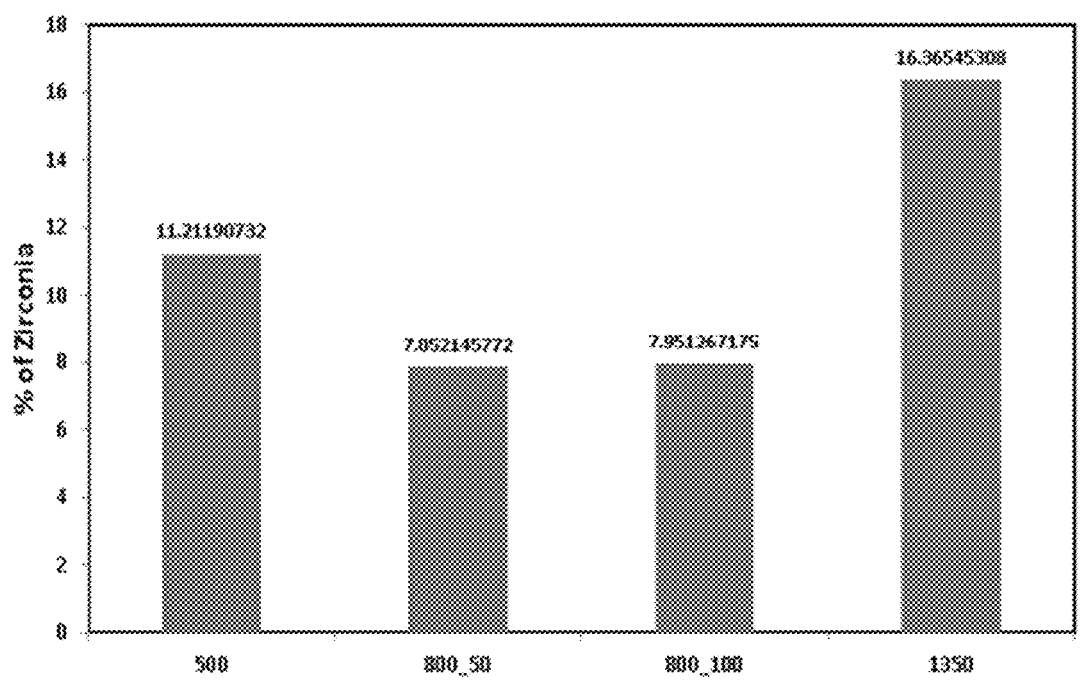
FIG. 4 illustrates a graphical representation percentage of grinding media impurity in a slurry, in accordance with an example embodiment of the present disclosure.

Five types of samples were prepared using the above method (with different addition of the grinding media and surfactant solution) and compared. The comparison of the five samples are illustrated in the form of a graph and table as shown in FIG. 2 to FIG. 4 and TABLE 1 respectively.

The first sample was prepared using the method as described above, with an addition of 1000 gm of grinding media without any supplementation of the grinding media. The first sample without the supplementation of the media was labeled as a base sample.

The second sample was prepared by adding 500 gm addition of the grinding media to the base sample with a supplementation of 50 gm of the grinding media at every hour till 1350 gm of total weight of the grinding media was present in totality in the slurry. The sample was labeled as 500_50 (that is 500 gm of media at the start and 50 in total addition at every hour).

The third sample was prepared by adding 800 gm of the grinding media to the base sample with supplementation of 50 gm of the grinding media at every hour till 1350 gm of media was present in totality. The sample was labeled as 800_50 (that is 800 gm of media at the start and 50 in total addition at every hour).

The fourth sample was prepared by adding 800 gm of the grinding media to the base sample with supplementation of 100 gm at every hour till 1500 gm of media was present in totality. The sample was labeled as 800_100 (that is 800 gm of media at the start and 100 in total addition at every hour).

The fifth sample was prepared by adding 1350 gm of the grinding media to the base without supplementation. The sample was labeled as (1350).

The following TABLE 1 shows the values of the five samples with respect to the particle size of the zinc oxide powder (metal oxide powder) and the percentage of zirconia (grinding media) in totality of the slurry.

TABLE 1

| Sl. No. | Sample | Grinding Time (Hour) | Mean Diameter (nm) | Median Diameter (nm) | % > 100 nm | % Zr impurity |
|---|---|---|---|---|---|---|
| 1 | Base | 12 | 102.36 | 91.46 | 61.05 | 10.34 |
| 2 | 500_50 | 12 | 94.16 | 88.16 | 66.12 | 11.21 |
| 3 | 800_100 | 12 | 87.03 | 82.45 | 77.10 | 7.85 |
| 4 | 800_50 | 12 | 86.73 | 82.28 | 77.61 | 7.95 |
| 5 | 1350 | 12 | 86.23 | 81.80 | 78.41 | 16.36 |

All the aforementioned five samples were run for comparable amounts of time (12 hours). Further, the second sample was run for 19 hours in total (higher than the others) to study the grinding step and observe the changes in the grinding and particle size. However, the second sample with 19 hours of grinding did not show any significant change after 12 hours for supplemented samples. The particle sizes were measured using the Horiba Particle Size Analyzer and the percentage of the grinding media present in the slurry were measured by Atomic Absorption spectroscopy.

Figure 2A:
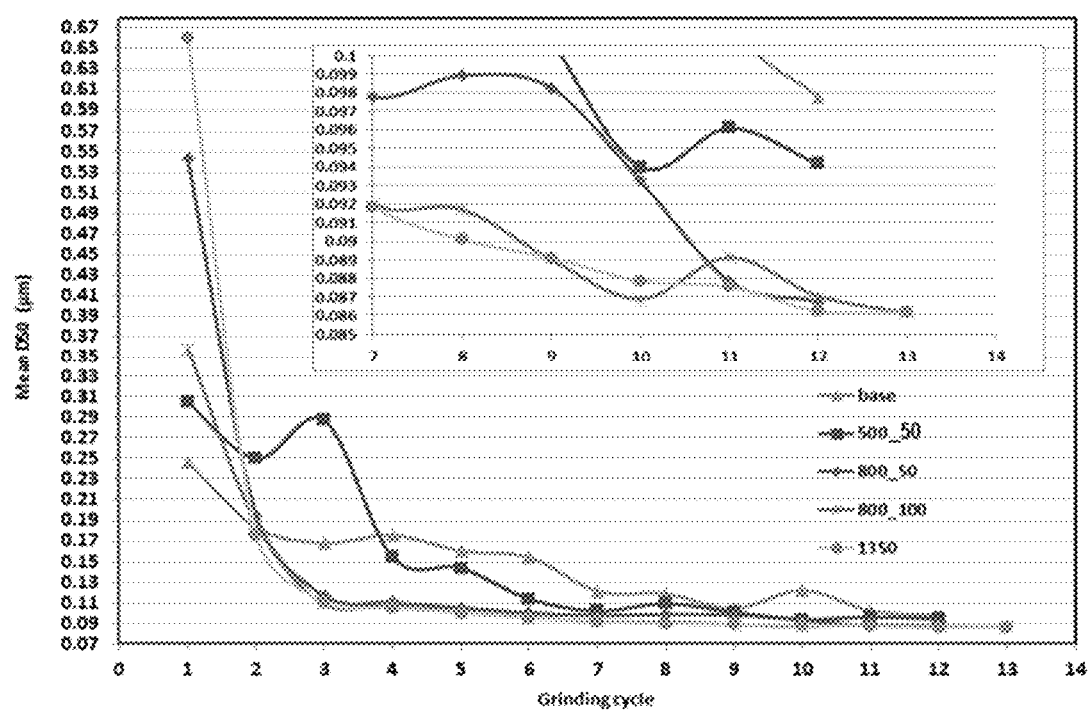
FIG. 2A illustrates a graphical representation of comparison of mean diameters and 2B illustrates a graphical representation of comparison of median diameters of the particles in grinding step, in accordance with an example embodiment of the present disclosure.
Figure 2B:
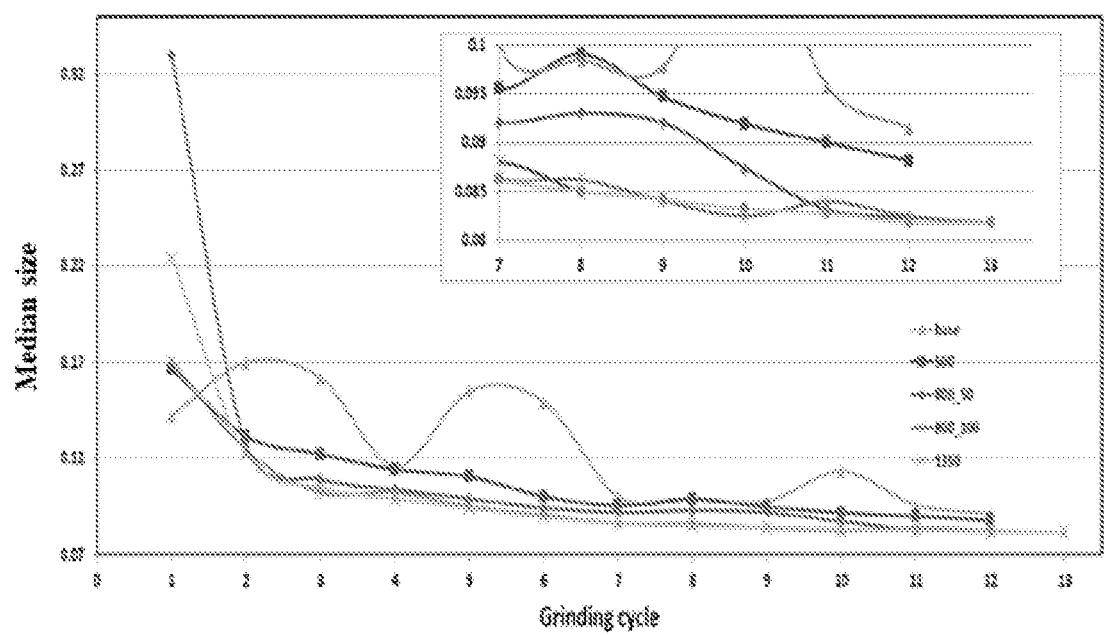

FIGS. 2A and 2B illustrate a graphical representation of comparison of mean diameters and median diameters of the particles in grinding step/cycle respectively of the five samples, in accordance with an example embodiment of the present disclosure. And, FIG. 3 illustrates a graphical representation of percentage diameters below 100 nm of the five samples, in accordance with an example embodiment of the present disclosure. As depicted in the graph, the base sample shows the largest mean and median diameter while 1350 (fifth sample) and 800_100 (fourth sample) show competing low particle median diameters.

Further, FIG. 4 illustrates a graphical representation percentage of grinding media impurity in a slurry, in accordance with an example embodiment of the present disclosure. As depicted in FIG. 4, while both samples 1350 (fifth sample) and 800_100 (fourth sample) show competing favorable properties, the high percentage of media impurities from 1350 may cause the nanocoolant to fail the ASTM corrosion test.

Thus, the present subject matter provides nanoparticles which are thermally conductive and nanocoolant with thermal conductivity and overall heat transfer coefficient double to that of base coolant.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

In various embodiments of FIGS. 1-4, a method for synthesis of nanoparticles is disclosed. The method provides a systematic addition of media and is an effective method to reduce particle size. It is observed that the high percentage of media impurities from can cause the nanocoolant to fail the ASTM corrosion test. Smaller amount of media was used at the start of the operation and periodically supplemented to prevent plateauing of particle size reduction. The present method provides a particle size of 76 nm or less with less energy consumption.

Although implementations for preparation of nanoparticles has been described in language specific to structural features and/or methods, it is to be understood that the appended claims are not necessarily limited to the specific features or methods described. Rather, the specific features and methods are disclosed as examples and implementations for synthesis of nanoparticles. The order in which the method(s) are described is not intended to be construed as a limitation.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope of disclosed embodiments being indicated by the following claims.

What is claimed is:

1. A method for synthesis of nanoparticles, the method comprising:
dispersing metal oxide powder in a mixture of a liquid medium and a surfactant to form a primary mixture, wherein the primary mixture comprises 10 to 20 weight percentage, of the metal oxide powder;
grinding the primary mixture using a grinding media to reduce particle size of the metal oxide powder and to obtain a suspension of metal oxide nano particles in form of a slurry, wherein the grinding media is selected from a group consisting of zirconia, alumina, agate, silica, porcelain, and steel, wherein the primary mixture is ground using a grinder, and wherein while grinding the primary mixture, the particle size of the metal oxide nano particles is periodically assessed to attain an average particle size of the metal oxide nano particles less than 80 nm;
periodically adding a surfactant solution to the slurry, wherein varying concentration of the surfactant solution is prepared by continuous stirring and heating of the surfactant with distilled water, wherein the varying concentration of the surfactant solution is added to the slurry at periodic time intervals and the surfactant is polyvinylpyrrolidone;
extracting a predetermined amount of sample from the slurry to obtain a testing solution to assess the particle size of the metal oxide powder in the slurry using a particle size analyzer;
systematically adding the surfactant solution and the grinding media to the slurry based on the assessed particle size in the testing solution until the average particle size of the metal oxide nanoparticles is achieved, wherein the systematic addition of the surfactant solution and the grinding media facilitates prolonged steady state of grinding process and finer particle size in a steady state of the slurry, wherein systematically adding comprises periodically supplementing the surfactant solution and the grinding media to the slurry based on the assessed particle size, to effectively reduce the particle size;
vacuum filtrating the slurry to separate the grinding media from the slurry;
sonicating the vacuum filtered slurry using a dispersant and a dispersing medium to obtain a diluted slurry; and
dispersing the diluted slurry to obtain a nano coolant comprising a diluted slurry including the nano particles dispersed therein and testing the thermal conductivity and heat transfer coefficient of the nano coolant.

2. The method of claim 1, wherein the dispersant is one of carboxylic acids, esters, ethers, alcohols, sugar phosphates, and amines.

3. The method of claim 1, wherein the metal oxide powder comprises particles of at least one metal oxide having an average particle size in the range of about 0.1 microns to 100 microns and of 99% purity.

4. The method of claim 3, wherein the metal oxide powder comprises an oxide of at least one of aluminum, titanium, iron, silicon, zirconium, and zinc.

5. The method as claim 1, wherein the liquid medium is a coolant, and wherein the coolant comprises one of water and water-based antifreezes.

6. The method of claim 1, wherein the particle size analyzer analyzes the particle size using one of a laser diffraction, an acoustic spectroscopy, and an ultrasound attenuation spectroscopy.

7. The method of claim 1, wherein shape of the grinding media is one of spherical or non-spherical rounded bullet, cylpebs and elliptical.

8. The method of claim 1, wherein the grinding is performed in the grinder comprising at least one of a planetary ball mill, a stirred media mill, an attrition mill, and a bead mill.

* * * * *